United States Patent
Schilling et al.

(10) Patent No.: US 6,338,492 B1
(45) Date of Patent: Jan. 15, 2002

(54) SEALING SYSTEM FOR LARGE-SURFACE THIN PARTS

(75) Inventors: Herman Schilling, Weinheim; Eberhard Bock, Mörlenbach; Günter Hofmann, Ladenburg, all of (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/514,539

(22) Filed: Feb. 28, 2000

(30) Foreign Application Priority Data

Feb. 27, 1999 (DE) .......................... 199 08 555

(51) Int. Cl.⁷ .................. F16J 15/02; H01M 2/08
(52) U.S. Cl. ............... 277/630; 277/638; 277/642; 277/650; 429/35
(58) Field of Search ....................... 277/630, 637, 277/638, 641, 642, 650, 594, 596; 429/34–6

(56) References Cited

U.S. PATENT DOCUMENTS

| | | | |
|---|---|---|---|
| 2,722,043 A | * 11/1955 | Nenzell | |
| 2,858,156 A | * 10/1958 | Wootton | |
| 4,026,782 A | * 5/1977 | Bouy et al. | 204/254 |
| 4,175,025 A | * 11/1979 | Creamer et al. | 204/253 |
| 4,207,165 A | * 6/1980 | Mose et al. | 204/258 |
| 4,342,460 A | * 8/1982 | Eng | |
| 4,588,105 A | * 5/1986 | Schmitz et al. | 220/359 |
| 5,284,718 A | * 2/1994 | Chow et al. | 429/26 |
| 5,595,834 A | * 1/1997 | Wilson et al. | 429/30 |
| 6,057,054 A | * 5/2000 | Barton et al. | 429/42 |
| 6,080,503 A | * 6/2000 | Schmid et al. | 429/35 |
| 6,159,628 A | * 12/2000 | Grasso et al. | 429/35 |

FOREIGN PATENT DOCUMENTS

| | | |
|---|---|---|
| EP | 0 604 683 | 7/1994 |
| EP | 0 774 794 | 5/1997 |
| WO | 93/06627 | 4/1993 |

* cited by examiner

*Primary Examiner*—Anthony Knight
*Assistant Examiner*—Alison K. Pickard
(74) *Attorney, Agent, or Firm*—Kenyon & Kenyon (57) ABSTRACT

A sealing system for large-surface thin parts to be interconnected, used for the mutual sealing of separating plates, in particular of bipolar plates with interposed ion-exchange membrane units (MEA) in fuel cells. The system uses sealing elements made of polymer material, in which the individual sealing elements, injected into recesses, form an integral unit with the respective associated bipolar plate. Provision is made between the side walls of the sealing elements and the adjacent walls of the recesses for free spaces or gaps to accommodate the elastic sealing material which spreads during the compression. The sealing elements only partially fill the recesses or gaps and the height (H) of the sealing elements are greater than the depth (T) of the recess or gaps before the compression.

14 Claims, 12 Drawing Sheets

Section A-A

Section A—A

SEALING SYSTEM FOR LARGE-SURFACE THIN PARTS

BACKGROUND OF THE INVENTION

The invention relates to a sealing system for large-surface thin parts to be interconnected, used for the mutual sealing of adjacent separating plates, in particular of bipolar plates with interposed ion-exchange membrane units (MEA) in fuel cells, using sealing elements made of polymer material, in which the individual sealing elements, inserted into recesses, form an integral unit with the respective associated bipolar plate.

Electrochemical fuel cells have gained importance in recent time. Various types are available, depending on the building or fuel materials used. Thus, for example, the PCT Application WO 93/06627 deals with such a fuel cell in detail. Regardless of the configuration of the fuel cells, the sealing of the individual gas-containing and liquid-containing channels is of great importance. No more precise statements are made about this in the PCT Application indicated. It is merely noted that the periphery of the individual separating plates is provided with a seal.

The European Patent PA 0 604 683 goes further into the sealing problem and suggests a sealing material made of silicon, rubber or extrudable elastomeric material. The sealing material is injected into the grooves of the separating plates before the plates are assembled. However, such a sealing system has the disadvantage that it very quickly loses elasticity during use, and therefore leakages may possibly occur.

It is also generally known to cement separately produced seals individually into the grooves provided in the separating plates. This process is time-consuming, difficult to control, and involves the danger of production errors. The mechanical stress during assembly often leads to deformation and stretching, making the seals useless. This results in a high rejection rate and a high work input.

The bipolar plates of a fuel cell are separated from each other by the so-called MEA (membrane-electrode assembly). If, for example, the seals of the two separating plates or bipolar plates, which are separated from each other by the MEA, are laterally displaced relatively to each other after the assembly, then an uneven distribution of forces and pressure occurs in the bipolar plates and in the seals which greatly stresses the individual components of the fuel cell. This lateral displacement of the seal can scarcely be avoided because of manufacturing tolerances.

In order to avoid the indicated problems, in the European Patent PA 0774 794, the present inventors suggested forming the separating plates, i.e., providing them with an elevation, in such a way that they form the seal at the same time. However, this presupposes that the separating plates are made of a flexible, plastically malleable material.

SUMMARY OF THE INVENTION

The object of the invention is to provide a sealing system which allows simple and quick assembly of the fuel cell and also ensures uniform distribution of forces and pressure in the individual components. The set objective is achieved according to the invention in a sealing system of the general type noted above, in that between the side walls of the sealing elements and the adjacent walls of the recesses, provision is made for free spaces or gaps to accommodate the elastic sealing material which spreads during the compression, the sealing elements only partially filling the recesses or gaps and the height of the sealing elements being greater than the depth of the recesses or gaps before the compression. Thus, a system is created in which the elasticity of the sealing material is not neutralized during the compression due to an impeded transverse expansion. The sealing material is able to spread laterally when pressing the plates together, and a reliable seal is attained. The sealing system also easily accommodates the changes occurring in the expansion of the components during the operation of the fuel cell.

Denoted as a recess in this case is any form on a separating or bipolar plate into which the sealing element is introduced. The recess can be in the form of a trough-like depression, or can also be formed as a groove. However, there must be adherence to the condition that the volume of the sealing elements jutting out beyond the recesses is less than the volume of the free spaces or gaps of the recesses existing when the sealing elements are not compressed. Adequate free space must be provided so that the sealing material can spread laterally during the compression. In this context, a free space or gap must be provided for this purpose on at least one side of the sealing element.

The bipolar plates are produced predominantly of graphite, sheet metal or electrically conductive polymers. Particularly in the case of bipolar plates made of graphite, the adherence of the seal to the graphite is problematic. To achieve the greatest possible reliability in this case, when working with bipolar plates having recesses on one side, the groove is produced in the form of an undercut, or the bottoms of the valleys are provided with blind holes, to thus anchor the sealing elements in the plates. At the same time, it is also beneficial if the blind holes are aligned diagonally with respect to the plate plane, or if they have an enlargement at their bottom. In this manner, the injected seal sticks mechanically to the plate.

According to another specific embodiment, the bipolar plates with recesses on one side can have traversing holes that start from the valley bottom and open through into bore holes of a larger diameter applied from the other side of the plate. Because of this, during the injection process, a portion of the sealing material gets through the plate into the bore hole and spreads out in it. The sealing elements are reliably anchored in this way, which can be used in particular when working with fuel-cell plates for which a double-sided sealing system is not necessary.

For bipolar plates that are to be provided with sealing elements on both sides, it is advantageous if, given recesses lying opposite each other, their valley bottoms are provided with through-holes. In this case, the opposite sealing elements are interconnected during the injection process in a manner that they cannot be lost.

For many bipolar plates, the sealing elements are applied to the outer edges of the plates or to the edges of openings in the plates. In this case, in a further refinement of the inventive idea, the bipolar-plate edges can be stepped on one or two sides and in each case be bordered by a sealing element. The relevant edges are embraced by the sealing element, and the seals are provided on both sides of the plate.

The above-described refinements of the sealing elements ensure that they are secured to the bipolar plates in a manner that they cannot become lost. In addition, the sealing elements of the individual plates are in alignment during their assembly, so that very good, uniform distribution of forces and pressure is achieved in the sealing elements. This uniform distribution of forces and pressure can be supported even further by furnishing the sealing elements with a protruding sealing profile on one of their sealing surfaces, the sealing profile coming to rest against the MEA in the region of the flat sealing surface of the adjacent sealing profile or sealing surface. This is particularly beneficial if the relatively soft and thin membrane is held between the sealing surfaces.

BRIEF DESCRIPTION OF THE DRAWINGS

The invention is explained in more detail with reference to several exemplary embodiments depicted in the Drawings.

DETAILED DESCRIPTION OF THE INVENTION

Figure 1:
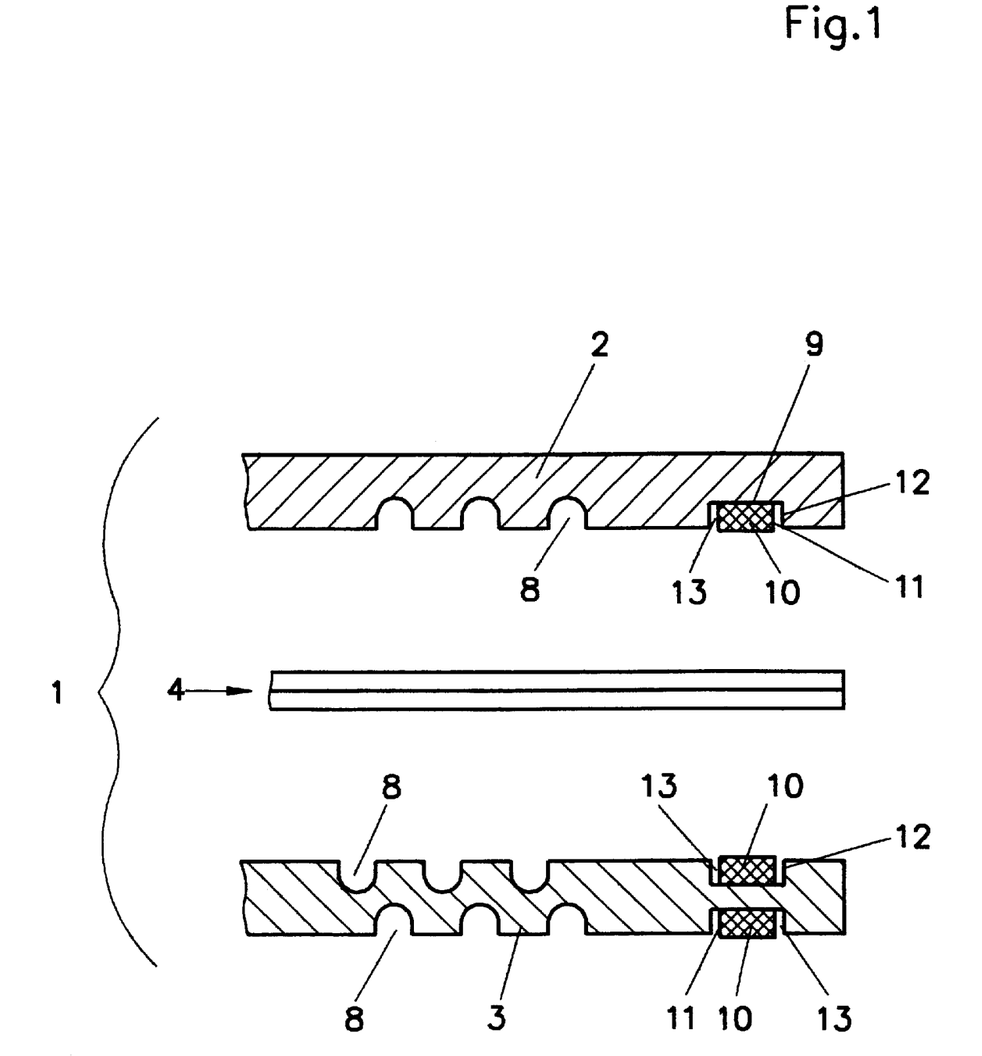
FIG. 1 is a sectional view taken through the rim zone of a cell with inserted sealing elements in the non-compressed state.
Figure 2:
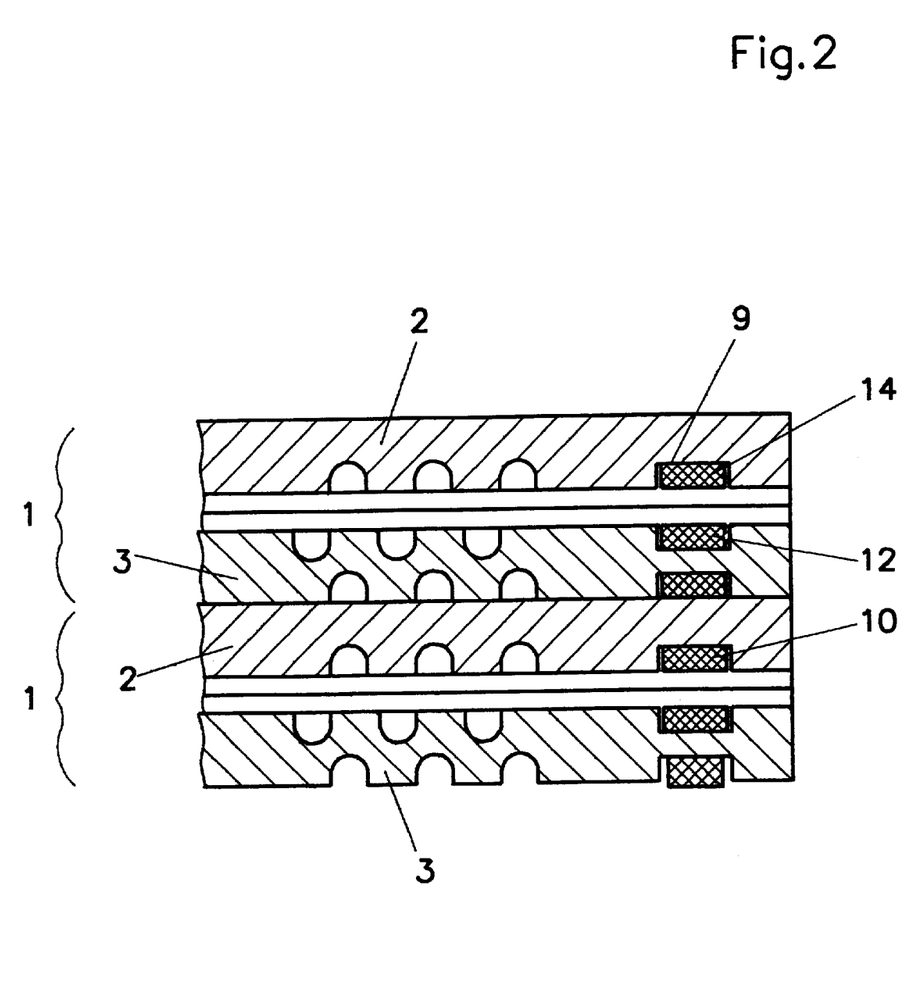
FIG. 2 is a view of the rim zone, in section, of two interconnected cells.

FIG. 1 shows a section through a rim zone of a fuel cell, details concerning the construction of the fuel cell having been omitted. Individual cell 1 is made essentially of bipolar plates 2 and 3 and the interposed MEA (membrane electrode assembly) 4. Bipolar plates 2 and 3 are provided with channels 8 for gases and liquids. Sealing elements 10 are inserted into grooves 9 of bipolar plates 2 and 3. In the exemplary embodiment shown, bipolar plates 2 and 3 are made of graphite. Grooves 9 are formed during the production of graphite plates 2 and 3. Sealing elements 10 are injected. Using an appropriate tool, the injection process is carried out in such a way that free gaps 13 are present between side walls 11 of sealing elements 10 and adjacent lateral groove walls 12. These gaps 13 are dimensioned in such a way that when seal 10 is compressed during the assembly, the gaps do not prevent the seal from expanding transversely, as shown in FIG. 2, so that the groove is not completely filled up even after repeated expansion of the seal in operation. Due to this measure, sealing elements 10, made of elastomeric material, retain their spring action. A reliable seal with uniform distribution of forces and pressure is attained in this manner.

In FIG. 2, a single cell 1 is interconnected with a further single cell 1. Single cells 1 are repeating units which are interconnected in the number provided for. They have basically the same construction. On both sides, compressed sealing elements 10 have outward curvatures 14 which do not abut against lateral groove walls 12. As for the rest, the structure of the parts in FIG. 2 corresponds to that of the parts in FIG. 1, so that one can refer to FIG. 1 with respect to the markings.

Figure 3A:
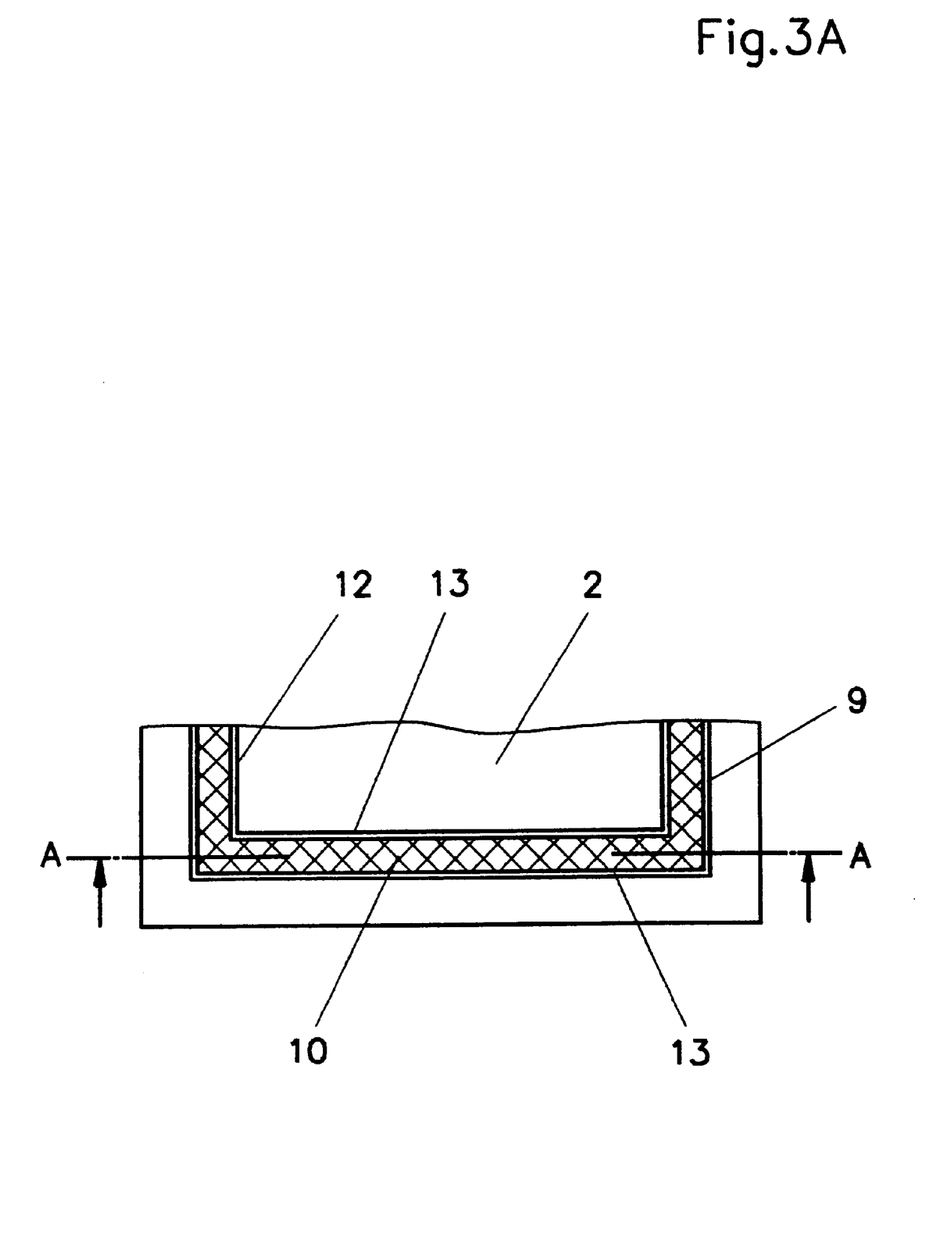
FIGS. 3A and 3B show a bipolar-plate part with injected seal and blind holes in the top view and in the section along Line A—A.
Figure 3B:
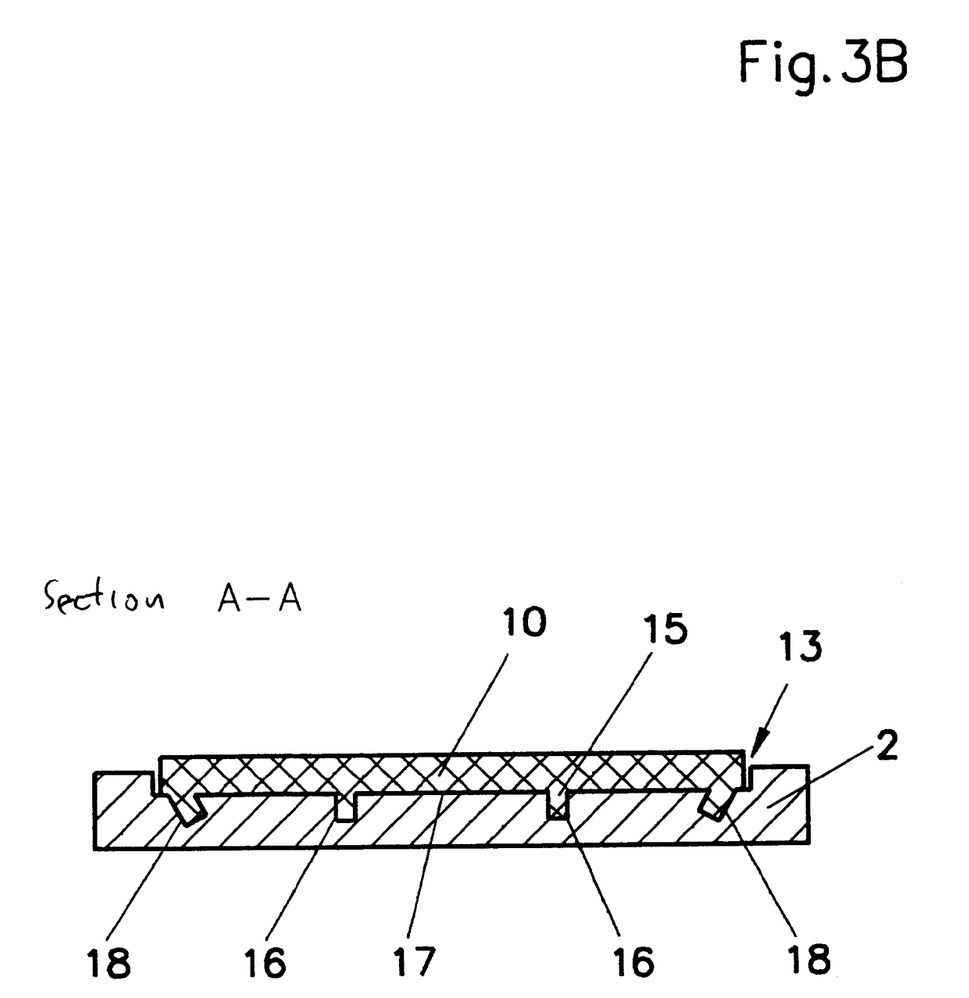

FIG. 3A shows a top view of a section of a bipolar plate 2 which is provided with a peripheral groove 9, and FIG. 3B shows a section along Line A—A. Sealing element 10 is inserted into groove 9. Free gap 13 is located between sealing element 10 and lateral groove walls 12. Sealing element 10 is retained in blind holes 16 by way of plugs 15. Plugs 15 are formed during the injection process. The material needed for them penetrates during the injection process into blind holes 16 which are placed in the valley bottom or groove bottom 17 and are distributed over the entire extent of the groove. In this manner, sealing elements 10 are anchored to bipolar plate 2. To strengthen this anchorage, individual or all of blind holes 16 can also be aligned diagonally with respect to the plate plane, and preferably be disposed in the angle center, as is shown, for example, in the case of blind holes 18. The diagonal arrangement of blind holes 18 is particularly advantageous at the corners of seal 10, since here they can absorb contraction tensions in two directions if blind holes 18 are aligned with the middle of the corner, e.g., approximately at the same angle with respect to the meeting groove walls.

Figure 4A:
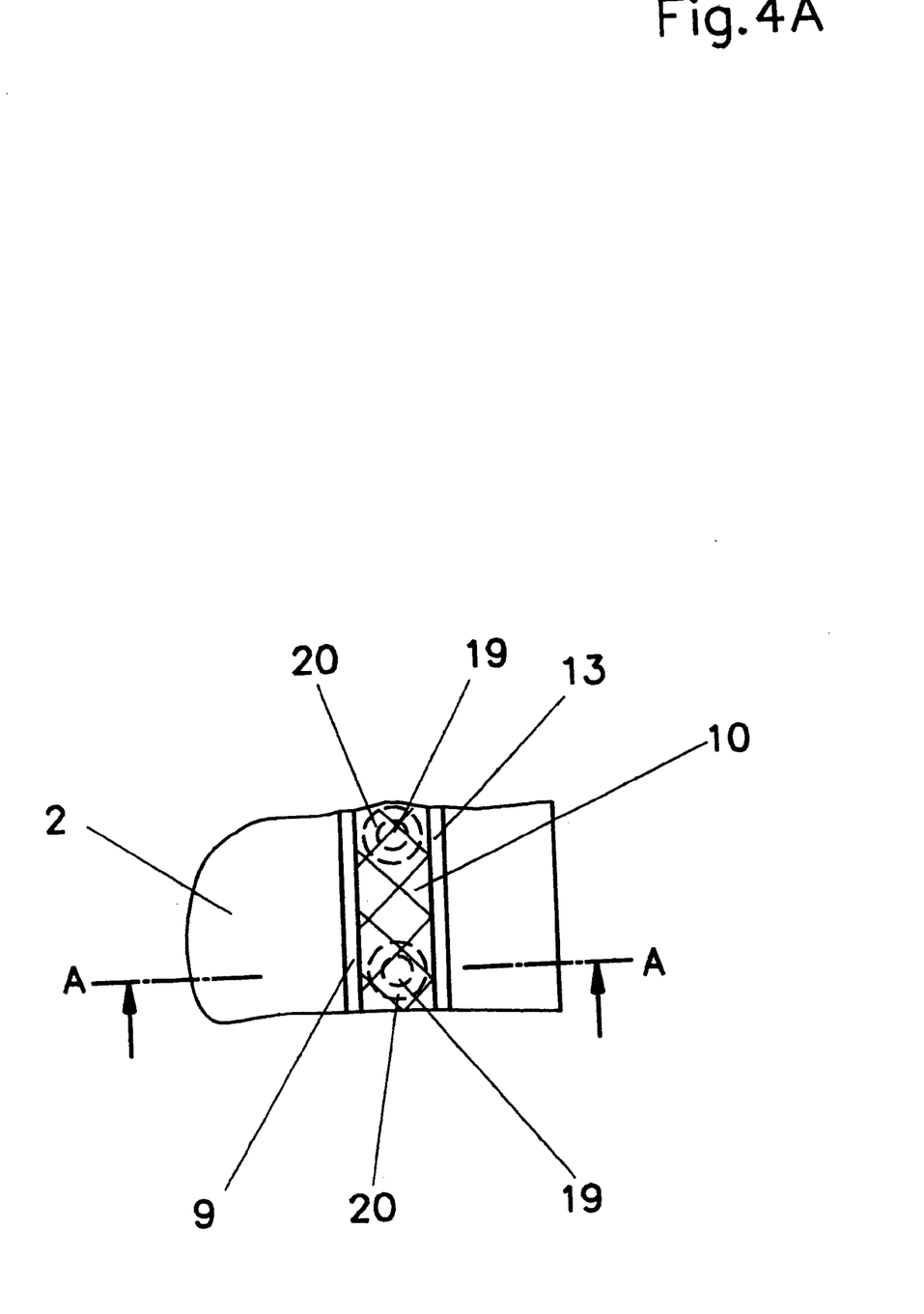
FIGS. 4A and 4B show a top view, in a cutaway portion, of a sealing system with traversing holes, and a section through the sealing system along Line A—A.
Figure 4B:
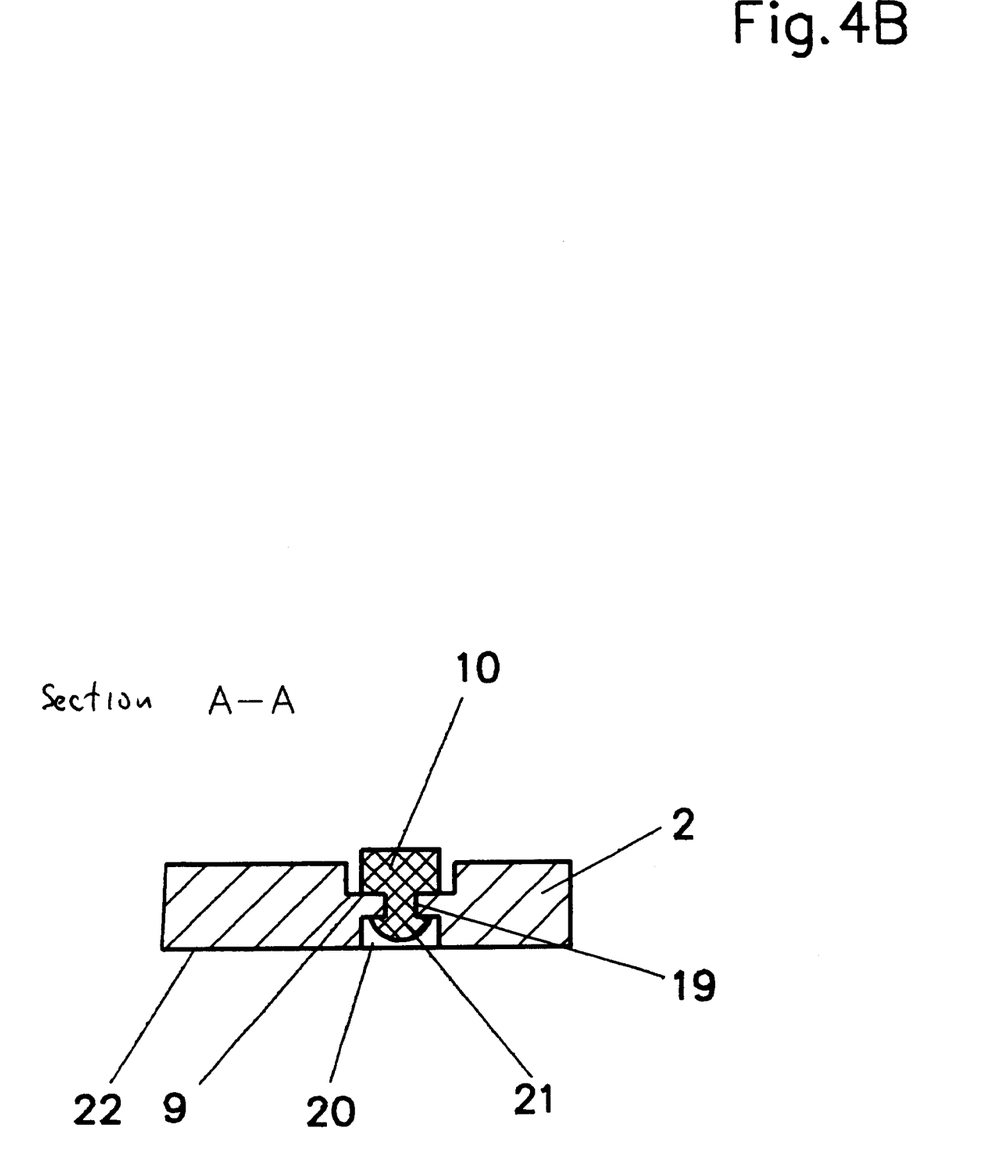

Another possibility for anchoring sealing elements 10 is shown in FIGS. 4A and 4B. There, as already described above, sealing elements 10 are inserted into groove 9 on only one side of bipolar plate 2. Placed on the other side of bipolar plate 2, exactly opposite groove 9, are bore holes 20 which are connected to groove 9 through holes 19. Bore holes 20 have a larger diameter than holes 19, so that during the manufacturing process, when sealing element 10 is injected into the groove, stoppers 21 which reliably retain sealing element 10 on bipolar plate 2 are formed in bore holes 20. Stoppers 21 do not project beyond plane 22 of bipolar plate 2, so that no disturbing outward curvatures result due to this.

Figure 5A:
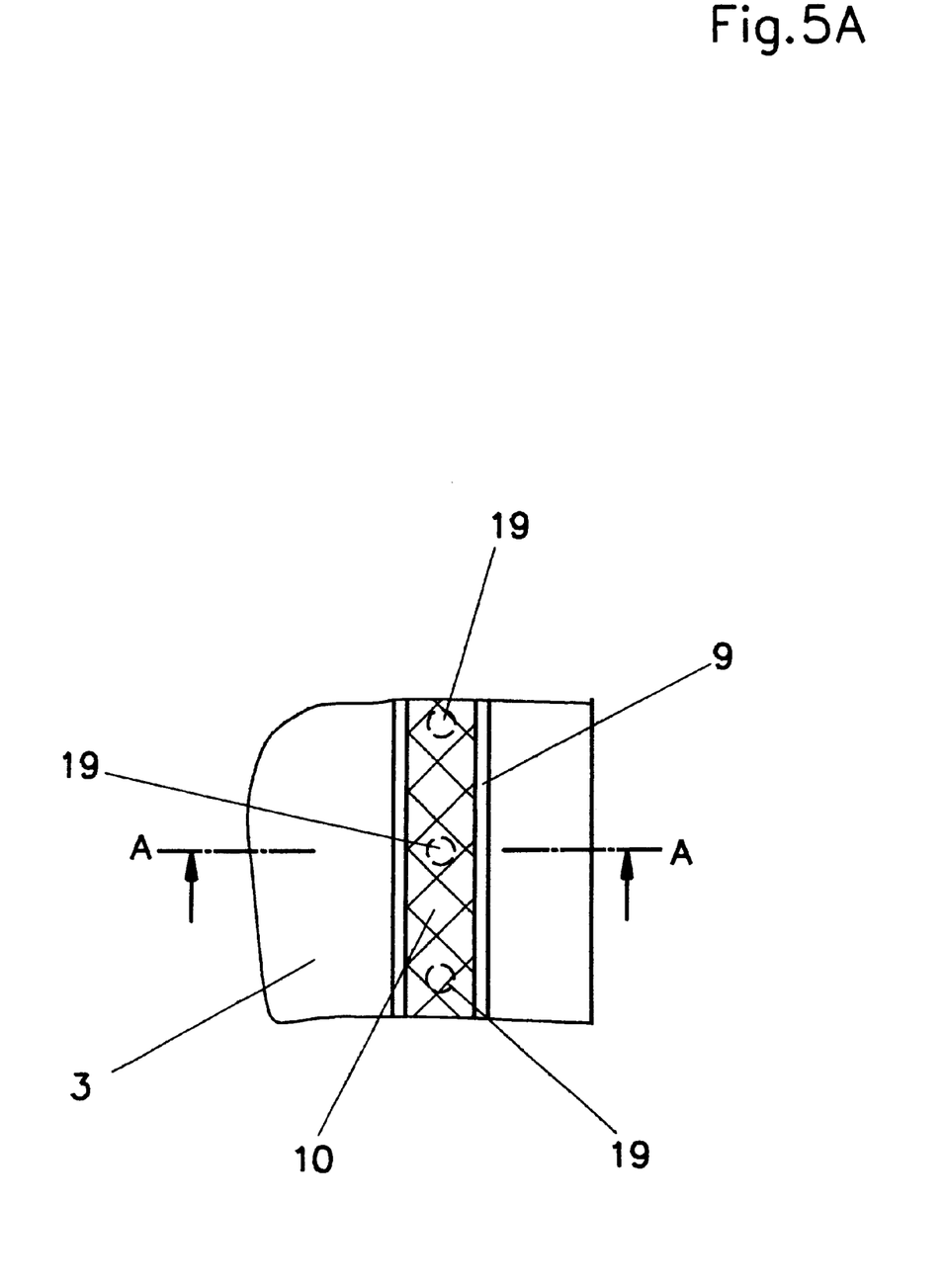
FIGS. 5A and 5B show a top view, in a cutaway portion, of a sealing system with opposite grooves and a section along Line A—A.
Figure 5B:
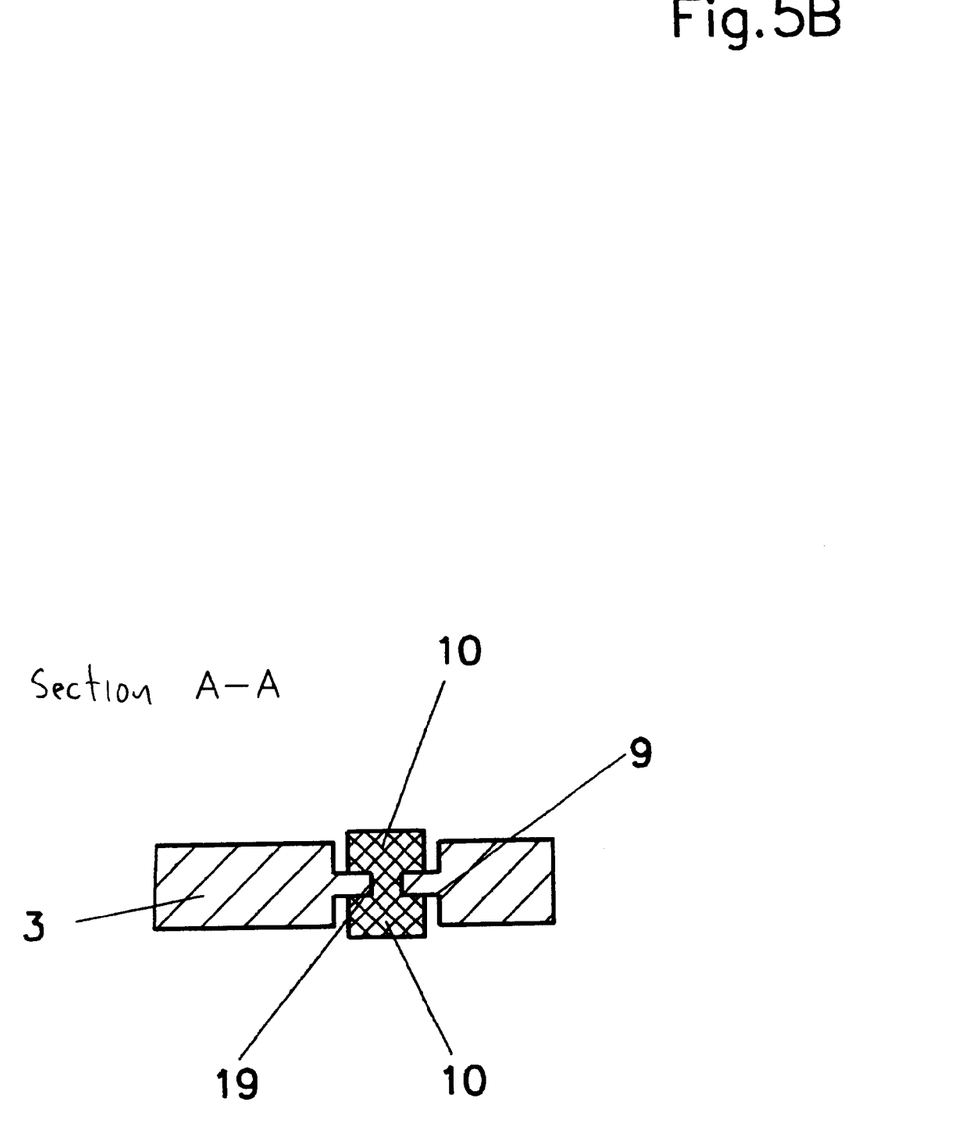

FIGS. 5A and 5B show an embodiment of the sealing system in which bipolar plate 3 is provided with sealing elements 10 on both sides. Bipolar plate 3 is furnished in grooves 9 with holes 19 that pass through. The two sealing elements 10 are interconnected via holes 19 during the injection process and thus are anchored to bipolar plate 3 in a manner that they cannot become lost.

Figure 6A:
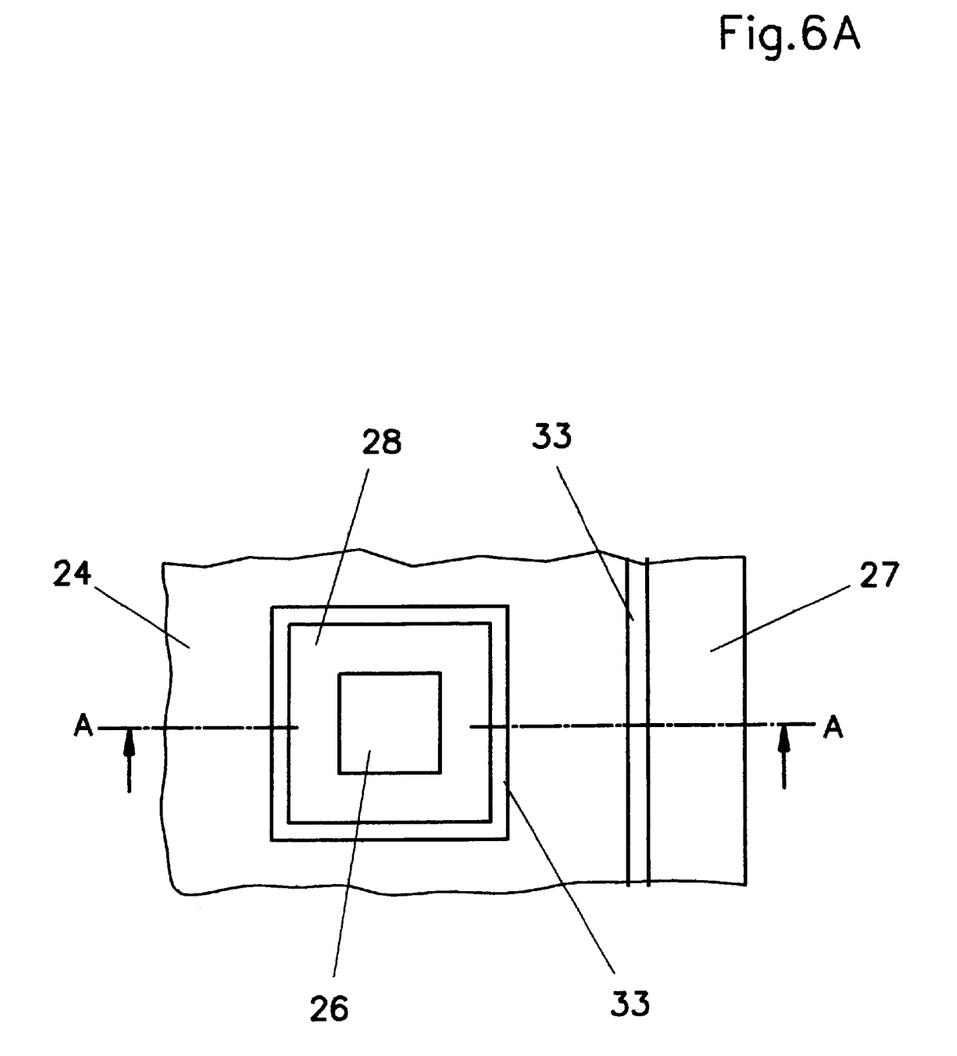
FIGS. 6A and 6B illustrate a segment from a sealing system having a rim seal and a seal at an opening through the bipolar plate, with a section along Line A—A.
Figure 6B:
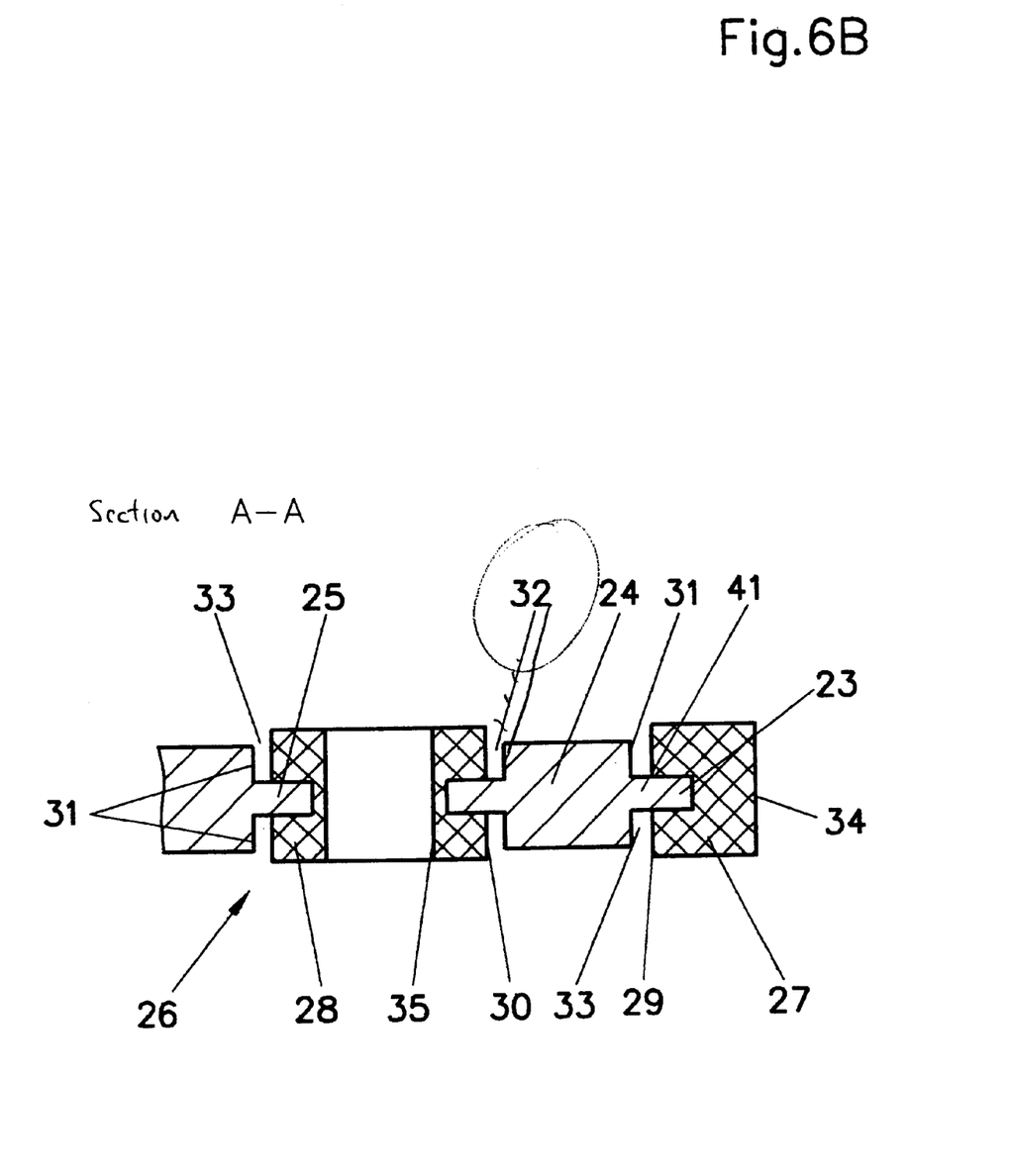

In the preceding exemplary embodiments, sealing elements 10 were disposed in grooves 9. An arrangement of sealing elements 10 on the outer rim 23 of a bipolar plate 24 or on rim 25 of an opening 26 in a bipolar plate 24 is also possible. This possibility is shown in FIGS. 6A and 6B. There, sealing elements 27 and 28 are inserted on outer rim 23 of bipolar plate 24 and on inner rims 25 of opening 26 in bipolar plate 24. As in the previous specific embodiments, care must be taken here as well that free gaps 33 exist between side walls 29 and 30 of sealing elements 27 and 28 and adjacent lateral groove walls 31 and 32, so that the elastic sealing element has sufficient possibility of spreading. In this case, the groove is, so to speak, one-sided; namely, only with reference to inner side 29 of external sealing element 27 or with reference to outer side 30 of an inner sealing element 28. Gap 33 is formed between seals 27 and 28, respectively, and bipolar plate 24. Sealing elements 27 and 28 are sprayed onto stepped rims 23 and 25. While gaps 33 yield sufficient free space for an elastic deformation of sealing elements 27 and 28 on the one side, the possibility of sealing elements 27 and 28 for elastic deformation is made possible on opposite sides 34 and 35 by sufficient free space at the rim and at opening 26.

Figure 7:
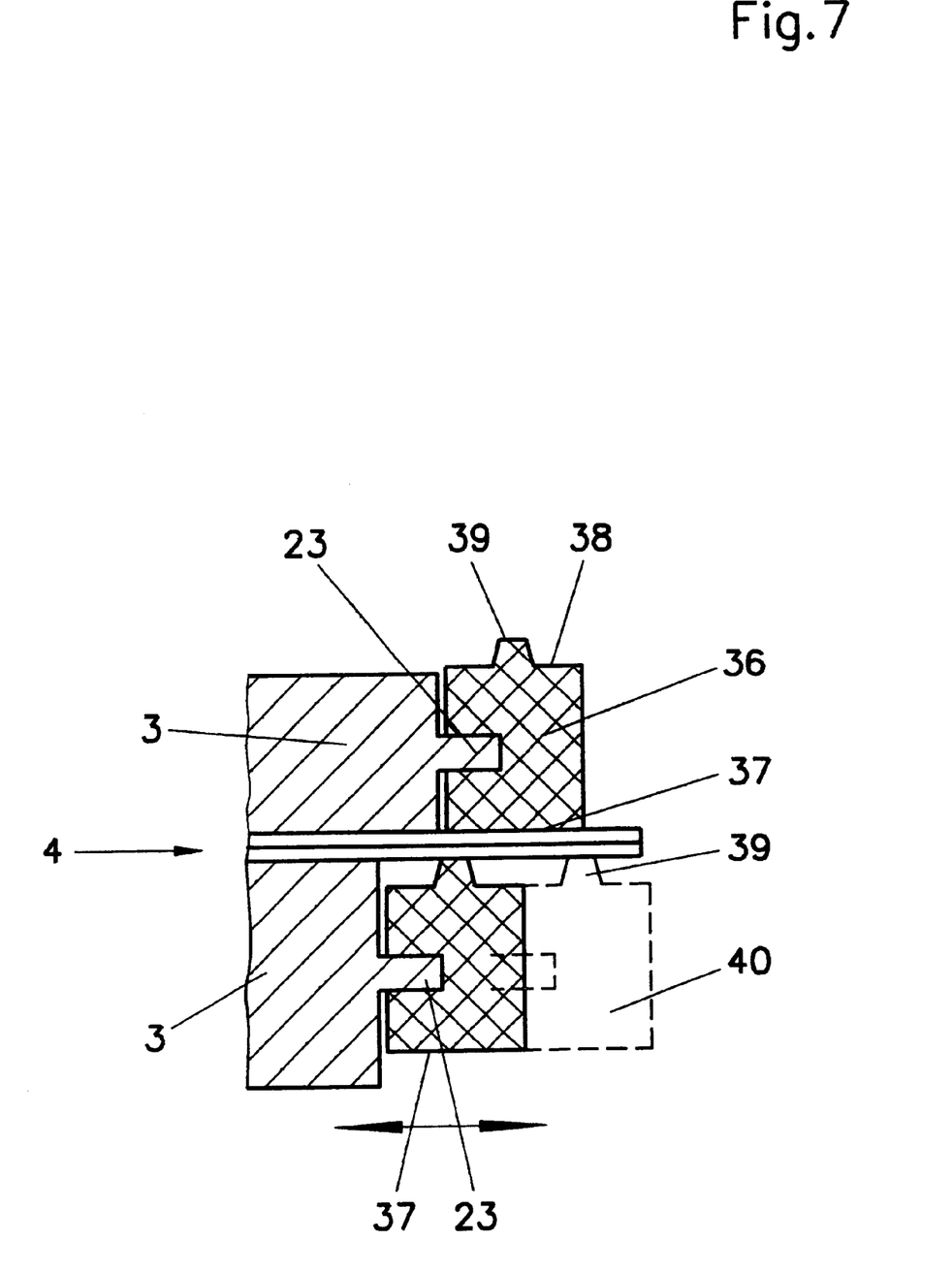
FIG. 7 shows a section through a sealing system having sealing elements with a protruding sealing profile.

The example in FIG. 7 deals with a particularly beneficial specific embodiment of a sealing element 36 which has an essentially flat sealing surface 37 on the one side, and has a sealing surface 38 with a protruding sealing profile 39 at the other side. As described in FIGS. 6A and 6B, rim 23 of bipolar plate 3 is stepped and holds sealing elements 36 and 40. MEA 4 lies between sealing elements 36 and 40. On the lower side of the figure, sealing element 40 is shifted to the left with respect to the center of sealing element 36. In addition, sealing element 40 is drawn in with a dotted line, shifted to the right with respect to the middle of sealing element 36. Such displacements can come about due to tolerance reasons during the assembly or even during operation. However, because of protruding sealing profile 39, an extremely reliable and uniform distribution of forces and pressure is achieved in any position of sealing element 40 with respect to sealing element 36. Sealing profile 39 abuts against MEA 4 in the region of flat sealing surface 37 of sealing element 36. Of course, sealing profile 39 can be used in the case of sealing elements 10 of FIGS. 1 through 6B as well.

Figure 8:
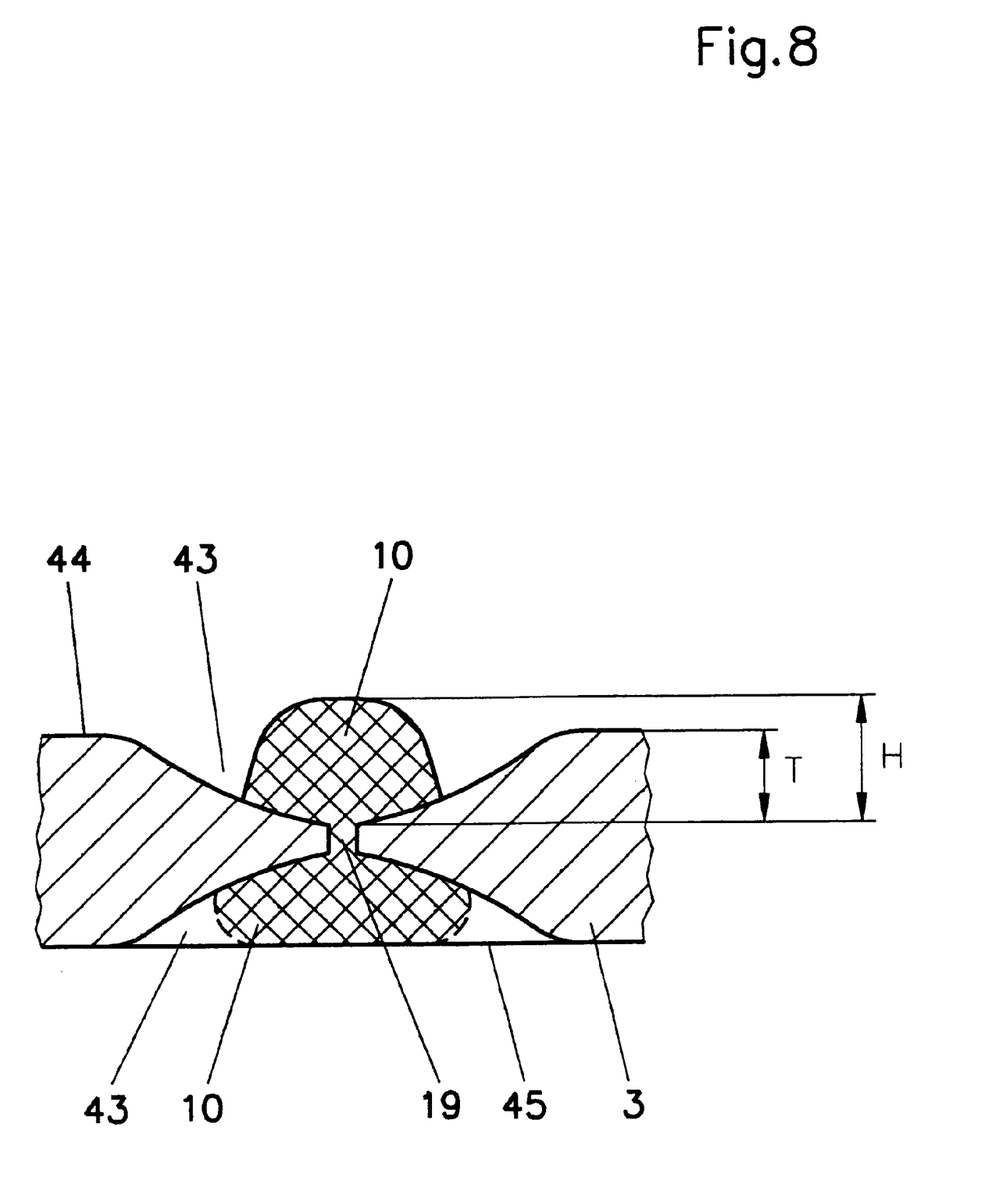
FIG. 8 is a section through a sealing system in trough-like recesses.

FIG. 8 shows, in section, sealing elements 10 which are inserted into trough-like recesses 43 on both sides of bipolar plate 3. Sealing elements 10 are interconnected via holes 19. Height H of unpressed sealing elements 10, measured from the valley bottom of recess 43, is greater than depth T of recess 43 measured from the valley bottom to top surface 44 of bipolar plate 3. In the upper part of the Figure, sealing element 10 is shown in the unpressed state. It extends beyond top surface 44 of bipolar plate 3. In the bottom part of the Figure, sealing element 10 abuts against a surface 45 of an adjacent bipolar plate or MEA and is compressed. It can be clearly seen that after sealing element 10 is compressed, there is still sufficient possibility for it to spread in recesses 43. Thus, the elasticity of sealing element 10 is retained.

What is claimed is:

1. A sealing system for the mutual sealing of adjacent separating bipolar plates with interposed ion-exchange membrane units (MEA) in fuel cells, the sealing system comprising:

at least one bipolar plate having recesses with walls of a depth (T); and polymeric elastic sealing elements having sidewalls spaced apart so that when the sealing elements are placed within the recesses there remains a gap between the walls of the recesses and the sidewalls of the sealing element to accommodate the lateral spread of the elastic sealing material during compression such that the sealing elements only partially fill the recesses and gaps and wherein the sealing elements prior to compression have a height (H) that is greater than the depth (T) of the recesses.

2. The sealing system as recited in claim 1, wherein the recesses are trough-like depressions.

3. The sealing system as recited in claim 2, wherein a volume of the sealing elements juts out beyond the recesses and is less than the volume of the gaps of the recesses existing when the sealing elements are not compressed.

4. The sealing system as recited in claim 1, wherein the recesses are formed as grooves.

5. The sealing system as recited in claim 1, wherein a volume of the sealing elements juts out beyond the recesses and is less than the volume of the gaps of the recesses existing when the sealing elements are not compressed.

6. The sealing system as recited in claim 5, wherein a free space or gap is present on at least one side of the sealing element.

7. The sealing system as recited in claim 1, wherein a free space or gap is present on at least one side of the sealing element.

8. The sealing system as recited in claim 1, wherein, in the bipolar plates have recesses on one side, and comprise valley bottoms with blind holes.

9. The sealing system as recited in claim 8, wherein the blind holes are aligned diagonally with respect to the plate plane.

10. The sealing system as recited in claim 8, wherein the blind holes are enlarged toward their bottom.

11. The sealing system as recited in claim 8, wherein the bipolar plates comprise recesses on one side that have traversing holes that start from the valley bottom and open through into bore holes of a larger diameter applied from the other side of the plate.

12. The sealing system as recited in claim 1, wherein, in the case of bipolar plates with mutually opposite recesses on both sides, valley bottoms are provided that are interconnected by holes passing through.

13. The sealing system as recited in claim 1, wherein rims to be sealed of the bipolar plates are provided with a one-sided or two-sided stepped edge which in each case is bordered by a sealing element.

14. The sealing system as recited in claim 1, wherein the sealing elements are furnished with a protruding sealing profile on one of their sealing surfaces, the sealing profile abutting against the MEA in the region of the flat sealing surface of the adjacent sealing element.

* * * * *